United States Patent [19]
Knappert et al.

[11] Patent Number: 5,261,761
[45] Date of Patent: Nov. 16, 1993

[54] ABS MANHOLE ADAPTER SERVING AS A COUPLING-COLLAR OF A RESILIENT CONNECTOR ASSEMBLY USED IN MAKING A CONNECTION BETWEEN A PRECAST REINFORCED CONCRETE MANHOLE AND A PVC SEWER PIPE

[76] Inventors: James H. Knappert, 2115 122nd Pl. SE., Everett, Wash. 98208; Tony A. Wall, 12102 4th Ave. W., Apt. 4-301, Everett, Wash. 98204; Steven W. Elliot, 13516 29th Ave. SE., Bothell, Wash. 98012

[21] Appl. No.: 875,094

[22] Filed: Apr. 28, 1992

[51] Int. Cl.⁵ ............................................... F16L 7/00
[52] U.S. Cl. ..................................... 404/25; 285/177; 285/189; 285/345
[58] Field of Search ................. 285/189, 284, 292, 21, 285/213, 215, 915, 177, 345; 404/25

[56] References Cited

U.S. PATENT DOCUMENTS

| | | | |
|---|---|---|---|
| 3,879,067 | 4/1975 | Keyser | 285/189 X |
| 4,997,215 | 3/1991 | Fournier | 285/345 X |
| 5,060,986 | 10/1991 | Carter | 285/177 X |

Primary Examiner—William P. Neuder
Attorney, Agent, or Firm—Roy E. Mattern, Jr.

[57] ABSTRACT

When a PVC sewer pipe is to be connected to a precast reinforced concrete manhole at a designated hole location thereof, this designated hole is made large enough to later accommodate grout and an inserted end of the PVC sewer pipe, on which an ABS manhole adapter is pre-positioned. This ABS manhole adapter serves as a coupling-collar, around which the grout is placed, as the grout is used to fill the remaining volume of the designated hole, thereby completing the resilient connector assembly used in making this connection between the precast reinforced concrete manhole and the PVC sewer pipe. This ABS manhole adapter has a cylindrical body having: an outside diameter surface structure, in turn having multiple adjacent rib-grooves formed therein to receive portions of grout; and also in turn having a longitudinal passageway structure to receive ground water unless a well-nut assembly thereof has the sealing nut in place; an inside diameter surface structure, in turn having a rib-groove to receive a circular continuous resilient seal to bear against a PVC sewer pipe; and such a resilient seal is so positioned in this rib-groove.

18 Claims, 2 Drawing Sheets

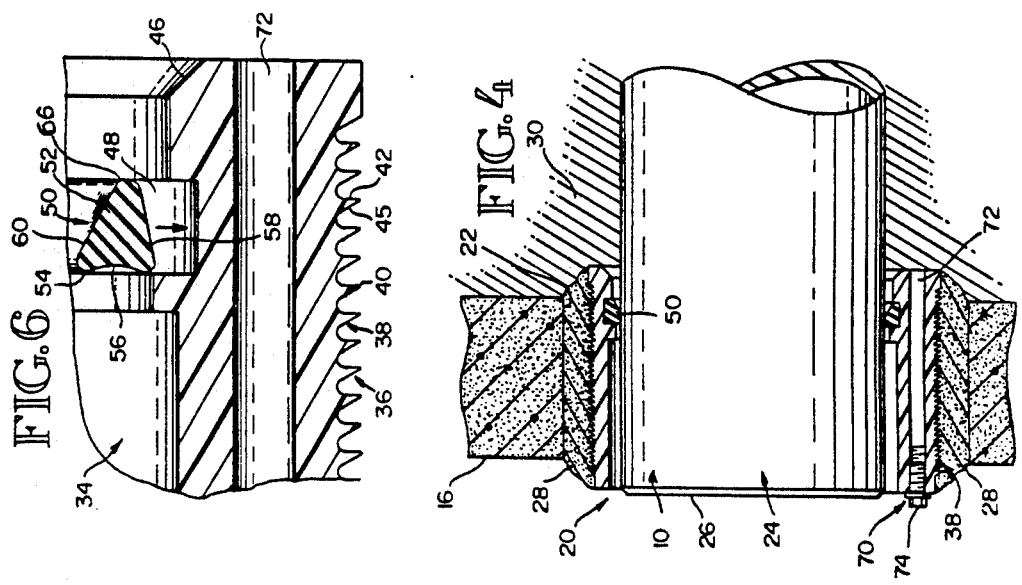
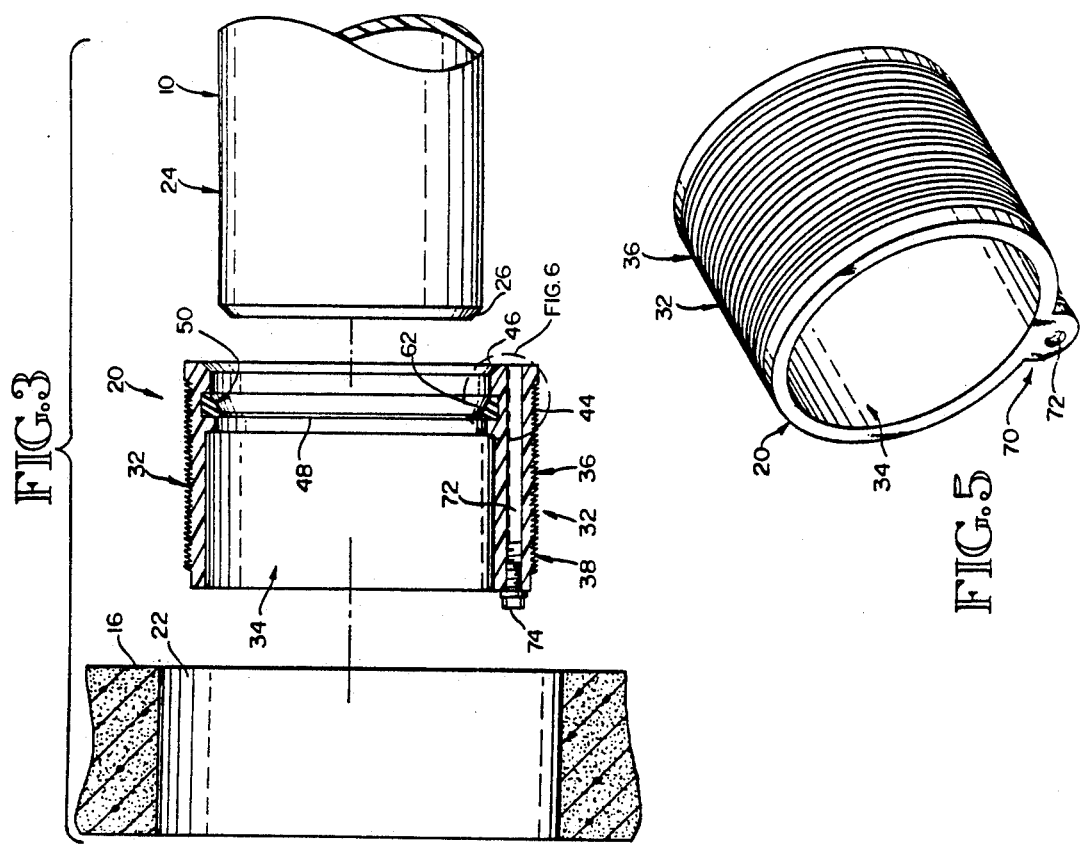

ABS MANHOLE ADAPTER SERVING AS A COUPLING-COLLAR OF A RESILIENT CONNECTOR ASSEMBLY USED IN MAKING A CONNECTION BETWEEN A PRECAST REINFORCED CONCRETE MANHOLE AND A PVC SEWER PIPE

BACKGROUND

Resilient connector assemblies are used in making a connection between a precast reinforced concrete manhole and a pipe. When grout is to be used in completing the connector assembly, then a coupling-collar is first used to position a seal internally to bear against the pipe, and thereafter used to receive the grout externally.

The GPK Products, Inc. company provides a coupling-collar having such an internal seal and providing an exterior to receive the grout. This coupling-collar provided by GPK Products, Inc. is described as a PVC Manhole Adapter to receive the internal seal which is referred to as a heavy duty rubber gasket. The exterior of this PVC manhole adapter has an abrasive silica layer, which allows the grout to bond the manhole adapter into a concrete manhole.

This GPK Products, Inc. PVC manhole adapter serves very well as a component of a resilient connector assembly, which completes the overall sealing, via use of grout, of the connection of a PVC pipe into a concrete manhole. However, there remains a need for another resilient connector assembly, via the use of grout, which could improve the resulting strength of the bonding of the grout to the coupling-collar and offer other advantages.

SUMMARY

A manhole adapter, serving as a coupling-collar of a resilient connector assembly used in making a connection between a precast reinforced concrete manhole and a PVC sewer pipe, when routing operations are undertaken, is made of an ABS material. The letters A, B, S, respectively refer to the Acrylonitrile, Butadiene, and Styrene Resin.

This ABS material is formed into a coupling-collar, by creating a cylindrical body having an outside diameter surface structure formed into multiple adjacent rib-grooves, which subsequently receive portions of grout to create a strong bond between the grout and this ABS manhole adapter.

Also the cylindrical body has longitudinal passageway structure to receive the flow of ground water, unless a well-nut assembly has a sealing nut in place at one end of this passageway structure. Ground water flows, if present, through this passageway structure, during grouting time, so grouting operations may be undertaken without the hindrance of the presence of water. Also ground water samples are taken at subsequent times, when these ground water samples are to be tested for their purity.

In addition the cylindrical body has a rib-groove to receive a circular continuous resilient seal, which, when installed, bears against a PVC sewer pipe. This sealing between the PVC sewer pipe coupled with the grout sealing between the cylindrical body and the manhole, creates the overall sealing of the installed ABS manhole adapter. In this way this ABS manhole adapter serves as an excellent coupling-collar of a resilient connector assembly used in making a connection between a precast reinforced concrete manhole and a PVC sewer pipe.

DRAWINGS

The ABS manhole adapter serving as a coupling-collar of a resilient connector assembly is illustrated in the drawings in respect to a typical installation and in respect to the construction of the ABS manhole adapter itself, wherein:

FIG. 3 is an exploded side view, partially sectioned, showing: a portion of the wall of the concrete manhole located nearby a receiving hole therein; the ABS manhole adapter positioned to be placed over the entering end of the PVC sewer pipe; and the PVC sewer pipe having a beveled or tapered end to contact the beveled or tapered end of the ABS manhole adapter;

Figure 2:
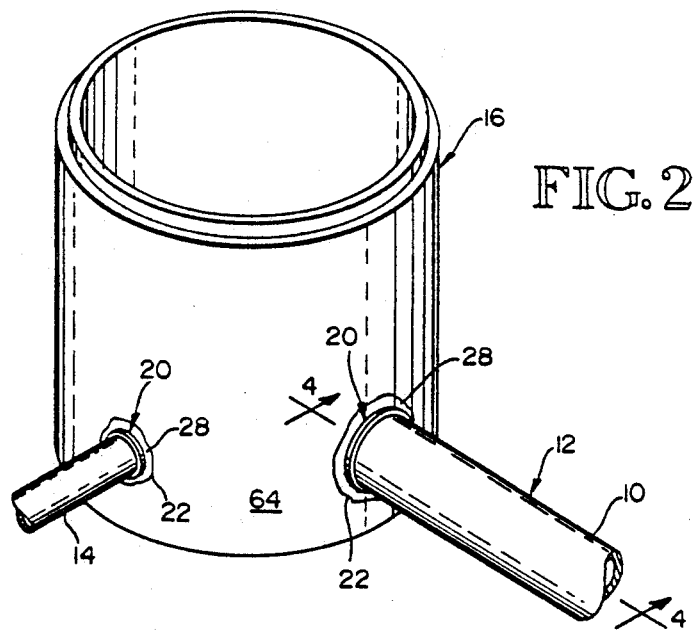
FIG. 2 is a perspective view of a precast reinforced concrete manhole illustrating the connection of both a small and large sewer pipe to the concrete manhole by using the ABS manhole adapter.

FIG. 4 is a side view, partially sectioned, and taken along line 4—4 of FIG. 2, illustrating: a portion of the wall of the concrete manhole located about a receiving hole therein; the ABS manhole adapter positioned on the end of the PVC pipe; the PVC pipe with the ABS manhole adapter positioned on it, and then in turn centered and positioned in the receiving hole; the grout filled in between the exterior of the ABS manhole and the interior of the receiving hole in the concrete manhole; the circular continuous seal positioned in the rib-groove of the ABS manhole adapter and extending radially therefrom to make sealing contact with the PVC sewer pipe; and the longitudinal passageway having a sealing well-nut assembly and, when the nut is removed, this passageway serves as a bypass for ground water to be kept clear of any volume where grouting is being undertaken;

FIG. 5 is a perspective view of the ABS manhole adapter, before its installation, as thereafter particularly shown in FIG. 4; and FIG. 6 is an enlargement of the area encircled in FIG. 3, to illustrate in cross-section, the entry of the continuous circular sealing ring into the rib-groove of the ABS manhole, and particularly showing the cross-section of the sealing ring, the multiple adjacent rib-grooves which will receive the grout, and the ground water passageway.

DESCRIPTION OF THE PREFERRED EMBODIMENT

Introduction

Figure 1:
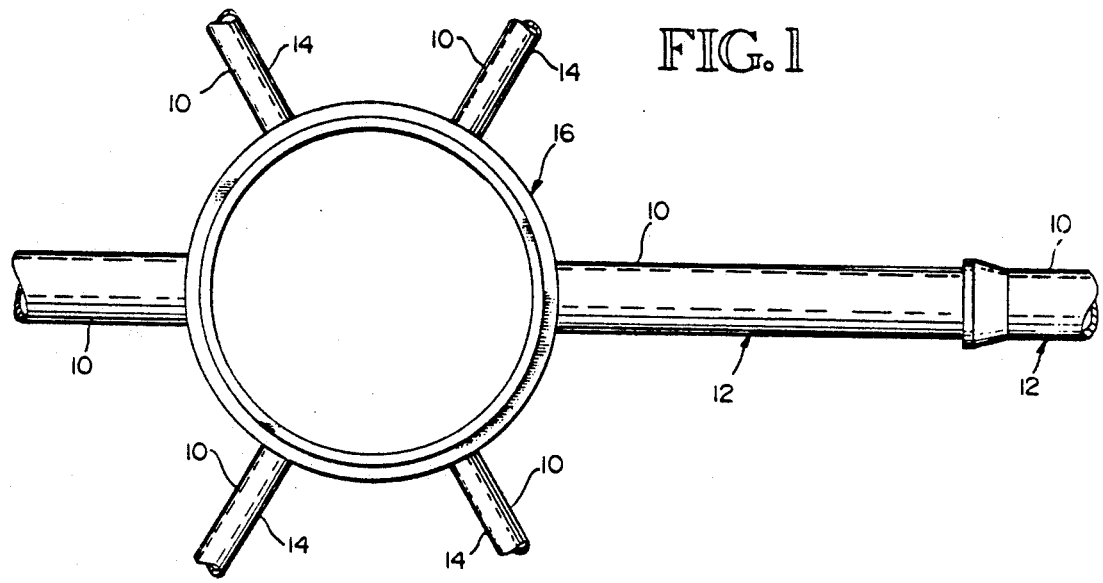
FIG. 1 is a top view of a particular location of underground sewer components showing a precast reinforced concrete manhole, a main sewer pipe line entering and leaving this concrete manhole, and four branch sewer pipes entering this concrete manhole, and showing how all of these sewer pipes are connected to the concrete manhole by using the ABS manhole adapter.

When a PVC pipe 10 of a main sewer line 14, is to be connected to a precast reinforced concrete manhole 16, an ABS manhole adapter 20 is utilized, as shown in all the figures of the drawings. Examples of typical connections of a main sewer line 12 and branch sewer lines 14 with a precast reinforced concrete manhole are illustrated in FIGS. 1 and 2. The ABS manhole adapter 20 is shown in FIG. 5 as it appears before the installation begins. The preassembly positioning of this ABS manhole adapter 20 with respect to a formed or cutaway hole 22 in the concrete manhole 16 and with respect to the end portion 24 of the PVC pipe 1, having a beveled or tapered leading edge 26, is shown in FIG. 3. Then the installed PVC pipe 10 and the ABS manhole adapter 20 with respect to the cutaway or formed hole 22 in the concrete manhole 16 is illustrated in FIG. 4, indicating the placement of the grout 28 and the surrounding earth fill 30. This ABS manhole adapter 20 serves as what is called in the trade, a coupling-collar of a resilient connector assembly.

The ABS Manhole Adapter

When creating a sealed connection between a PVC pipe 10 and a concrete manhole 16, the overall objective is to complete a leak proof connection which will remain so for a very long period of time. In doing so, there must be an excellent seal created and maintained between the exterior 32 of the manhole adapter 20 and the concrete manhole 16, and an excellent seal created and maintained between the interior 34 of the manhole adapter 20 and the PVC pipe 10. The interior 34 is also referred to as the inside surface structure 34.

In respect to creating the seal between the manhole adapter 20 and the concrete manhole 16, grout 28 is carefully packed around the exterior 32 of the manhole adapter 20 and throughout the volume defined by this exterior 32 and the hole 22 in the concrete manhole 16. To increase the strength and to maintain the seal of the interconnection between the exterior 32 of the manhole adapter 20 and grout 28, multiple rib-grooves 36 are formed throughout most of the exterior 32, which is also referred to as the outside diameter surface structure 32.

The ribs 38 are each triangular in shape, having an apex 40, serving as the most radial penetrating portion to be surrounded by the grout 28. Each triangular surface 42 facing the resilient seal end 44 of the manhole adapter 20 is radially orientated, being perpendicular to the centerline of the manhole adapter 20. The other triangular surface 45 of each rib-groove 36 is formed on a bias with respect to the centerline of the manhole adapter 20. This configuration of the rib-grooves 36 increases the resistive holding power, especially in reference to any created unwanted withdrawal forces.

In respect to creating the seal between the manhole adapter 20 and the PVC pipe 10, an internal resilient seal receiving channel 48, also referred to as a rib-groove 48, is formed in the interior 34 of the manhole adapter 20, at the seal end 44 thereof, to receive and to position the circular continuous resilient seal 50. In FIG. 6 the starting of the partial placement of this seal 50 into this channel 48 is illustrated. The triangular-like cross-section 52 of this seal 50 is also shown. It is of a modified trapezoidal shape. The base 54 of the triangle has a concave surface 56, serving to accommodate the entry of this seal 50 into the channel 48, or rib groove 48 and to bear against one side of the rib groove 48, and to help in maintaining the overall sealing power of this seal 50. The entry side 58 of the seal 50, which is a tapered side 58, is fully inserted down into channel 48. The sealing side 60 of the seal 50, which is a tapered side 60, when the seal 50 is installed in the channel 48 presents a circular sloping sealing surface 62 for the subsequent entry and sealing of the PVC pipe 10. The tapered top 66 or apex 66 of the seal 50 bears against the other side of the rib groove 48.

This arrangement of this seal 50, so shaped, in the channel 50, in respect to channel 50 location at this seal end 44 of the manhole adapter 20, where the PVC pipe 10 enters, not only creates an excellent seal, but also allows for a reasonable tolerance range of any possible misalignment of the centerline of the PVC pipe 50, with respect to a centerline extending perpendicularly to the circular side 64 of the concrete manhole 16 from the center of the hole 22 in the concrete manhole 16.

The interior 34 of manhole adapter 20, has a beveled or tapered entry 46, which serves to guide the entry of the beveled or tapered end 26 of the end portion 24 of the PVC pipe 10.

The ABS manhole adapter, in reference to the cylindrical body thereof, has the longitudinal length of this cylindrical body made to be greater than the thickness of a concrete manhole, creating an extended length portion. The portion is thereafter extended evenly beyond the thickness of a concrete manhole, at each end of a hole formed in a concrete manhole, to receive the cylindrical body, whereby the extended length, then respectively supports grout, in turn extending outwardly from the wall of the concrete manhole in respect to both inside and outside of a manhole.

The Longitudinal Passageway Structure of the ABS Manhole Adapter to Pass Ground Water When a Sealing Nut is Removed The ABS manhole adapter 20, preferably is formed to have a longitudinal passageway structure 70, having an internal uniform diameter smooth circular structure, to provide a passageway 72 for ground water. During the installation of the PVC pipe 10 with the ABS manhole adapter 20, the latter to be surrounded about the exterior 32 thereof with grout 28, if ground water is present, the ground water flows through this passageway 72. Therefore, the grouting operations are undertaken without interference of the ground water. When the installation is completed this ground water passageway is sealed by installing the removable sealing nut 74, which is also referred to as a well nut assembly 74.

The Longitudinal Passageway is Opened During Testing For Possible Contaminated Ground Run Off Waters and Other Solutions The first purpose of providing the longitudinal passageway structure 70 concerns the passage of ground water during the grouting operations. The second purpose is to have available when needed, a convenient way to test ground water, if present, for contaminates. The sealing nut 74 is temporarily removed during the taking of a test sample of the ground water.

Other Regular Installation Procedures Are Followed

Essentially all of the other regular installation procedures are followed. For example, there is a gravel bed provided for supporting the PVC pipe 10, as it is positioned before, during, and after its entry with respect to the concrete manhole 16. The ABS manhole adapter 20 is pre-positioned on the PVC pipe 10 before end portion 24 thereof is inserted into the hole 22 of the concrete manhole. As shown in FIG. 4, after the installation and pressure testing is completed, earth fill 30 is positioned over the PVC pipe 10.

The Materials and Parts Used

The manhole adapter 20 is referred to as an ABS manhole adapter 20. The letters A, B, S, respectively refer to acrylonitrile, butadiene and styrene resin. This ABS material is considered to be the best material currently available. The ingredients of the ABS resin utilized are: acrylonitrile/butadiene/styrene resin; acrylonitrile/systyrene resin; tallow; and wax, and the foaming agent is hydrocerol CLM 70.

The PVC material could also be used in creating the manhole adapter 20. The letters PVC respectively refer to polyvinyl chloride.

The sealing nut is also referred to as a well-nut kit.

SUMMARY OF ADVANTAGES

This manhole adapter, serving as a coupling-collar of a resilient connector assembly, insures the creation of an overall excellent seal, when connecting a PVC pipe to a concrete manhole. The exterior of the manhole adapter is formed to be sealed and to be held very well by the grout. The interior of the manhole adapter is formed to receive and to hold the continuous resilient seal in a position, where an excellent seal is maintained between the exterior of the PVC pipe and the interior of the manhole adapter.

The passageway for ground water is ready to be opened during the initial grouting and any possible regrouting. The passageway for ground water is ready to be opened at any time when samples of ground water are to be taken during testing for the possible presence of contaminates.

We claim:

1. An ABS manhole adapter serving as a coupling-collar of a resilient connector assembly used in making a connection between a precast reinforced concrete manhole and a PVC sewer pipe, comprising: a cylindrical body having an outside diameter surface structure, an inside diameter surface structure; an entry end structure to receive and to pass an inserted end of PVC sewer pipe; and an exit end structure to receive and to position an inserted end of a PVC sewer pipe;
   wherein
   a. the outside diameter surface structure has multiple adjacent rib-grooves formed therein, which subsequently receive portions of group placed between this said outside diameter structure and an interior structure of a hole in a concrete manhole, and also has longitudinal passageway structure having an internal uniform diameter smooth circular surface structure, which is positioned to be at the bottom of the installed ABS manhole adapter and which is used during either the original installation time of a resilient connector assembly, a later repair time, or a replacement time, whenever group is being inserted,
   whereby ground water is then directed through this longitudinal passageway structure and thereby kept from flowing into the volume being filled with group; and
   b. the inside diameter surface structure has a rib-groove formed therein, which subsequently receives a circular continuous resilient seal, and this resilient seal subsequently bears against a PVC sewer pipe, over the end of which this cylindrical body has been fitted.

2. An ABS manhole adapter, as claimed in claim 1, having, in addition, a well-nut assembly secured to the longitudinal passageway structure at an end thereof, for subsequent closure of this longitudinal passageway structure, when no grouting is being undertaken, and for subsequent reopening of this longitudinal passageway when repair grouting must be undertaken, or when ground water samples might be taken during inspection times.

3. An ABS manhole adapter, as claimed in claim 2, having a tapered structure at the entry end of the cylindrical body to receive and to guide an inserted end of a PVC sewer pipe, which itself preferably has a tapered end.

4. An ABS manhole adapter, as claimed in claim 3, having a circular continuous resilient seal fitted into the rib-groove of the inside diameter surface structure of the cylindrical body, to so remain, while contacting an inserted end of a PVC sewer pipe to create a watertight seal between the cylindrical body and the PVC sewer pipe.

5. An ABS manhole adapter, as claimed in claim 4, wherein the multiple rib-grooves formed in the outside diameter surface structure, have the ribs thereof formed with sloping surfaces facing toward the exit end structure, and vertical surfaces facing the entry end structure of the cylindrical body, thereby increasing the antiwithdrawal holding strength of a grouted in place cylindrical body.

6. An ABS manhole adapter, as claimed in claim 5, wherein the longitudinal length of the cylindrical body is greater than the thickness of a concrete manhole, and the extended length is thereafter extended evenly beyond the thickness of a concrete manhole, at each end of a hole formed in a concrete manhole, to receive the cylindrical body, whereby the extended length then respectively supports grout in turn extending outwardly both inside and outside of a manhole.

7. An ABS manhole adapter, as claimed in claim 6, wherein the cylindrical body is sized to create a respective inside surface structure, which in turn will receive a PVC diameter 8. An ABS manhole adapter, as claimed in claim 7, wherein the circular continuous resilient seal has a triangular-like cross-sectional shape, appearing as a modified trapezoidal shape, having a base with a concave surface positioned adjacent the side of the rib-groove, and tapered respective upstanding sides with one side directed down into the rib-groove, and the other side serving as the sealing surface, and a tapered top, creating an apex of this cross-sectional shape which bears against the other side of the rib-groove.

9. An ABS manhole adapter, as claimed in claim 8, wherein the ingredients of the ABS resin utilized are:
   acrylonitrile/butadiene/styrene resin;
   acrylonitrile/systyrene resin;
   tallow; and
   wax.

10. An ABS manhole adapter, as claimed in claim 9, having a foaming agent designated as hydrocerol CLM 70.

11. An ABS manhole adapter as claimed in claim 8, wherein the circular continuous resilient seal is made of a material having the sealing properties of a rubber seal.

12. A manhole adapter serving as a coupling-collar of a resilient connector assembly used in making a connection between a precast reinforced concrete manhole and a plastic sewer pipe, comprising: a cylindrical body having an outside diameter surface structure, an inside diameter surface structure; and entry end structure to receive and to pass an inserted end of plastic sewer pipe; and an exit end structure to receive and to position an inserted end of a plastic sewer pipe;
   wherein:

a. the outside diameter surface structure has multiple adjacent rib-grooves formed therein, which subsequently receive portions of group placed between this said outside diameter structure and an interior structure of a hole in a concrete manhole, and also has longitudinal passageway structure having an internal uniform diameter smooth circular surface structure, which is positioned to be at the bottom of the installed manhole adapter and which is used during either the original installation time of a resilient connector assembly, a later repair time, or a replacement time, whenever group is being inserted, whereby ground water is then directed through this longitudinal passageway structure and thereby kept from flowing into the volume being filled with grout; and b. the inside diameter surface structure has sa rib-groove formed therein, which subsequently receives a circular continuous resilient seal, and this resilient seal subsequently bears against a plastic sewer pipe, over the end of which this cylindrical body has been fitted.

13. A manhole adapter, as claimed in claim 12, having, in addition, a well-nut assembly secured to the longitudinal passageway structure at an end thereof, for subsequent closure of this longitudinal passageway structure, when no grouting is being undertaken, and for subsequent reopening of this longitudinal passageway when repair grouting must be undertaken, or when ground water samples might be taken during inspection times.

14. A manhole adapter, as claimed in claim 13, having a tapered structure at the entry end of the cylindrical body to receive and to guide an inserted end of a plastic sewer pipe, which itself preferably has a tapered end.

15. A manhole adapter, as claimed in claim 14, having a circular continuous resilient seal fitted into the rib-groove of the inside diameter surface structure of the cylindrical body, to so remain, while contacting an inserted end of a plastic sewer pipe to create a watertight seal between the cylindrical body and the plastic sewer pipe.

16. A manhole adapter, as claimed in claim 15, wherein the multiple rib-grooves formed in the outside diameter surface structure, have the ribs thereof formed with sloping surfaces facing toward the exit end structure, and vertical surfaces facing the entry end structure of the cylindrical body, thereby increasing the anti-withdrawal holding strength of a grouted in place cylindrical body.

17. A manhole adapter, as claimed in claim 16, wherein the longitudinal length of the cylindrical body is greater than the thickness of a concrete manhole, and the extended length is thereafter extended evenly beyond the thickness of a concrete manhole, at each end of a hole formed in a concrete manhole, to receive the cylindrical body, whereby the extended length then respectively supports grout in turn extending outwardly both inside and outside of a manhole.

18. A manhole adapter, as claimed in claim 17, wherein the circular continuous resilient seal has a triangular-like cross-sectional shape, appearing as a modified trapezoidal shape, having a base with a concave surface positioned adjacent the side of the rib-groove, and tapered respective upstanding sides with one side directed down into the rib-groove, and the other side serving as the sealing surface, and a tapered top, creating an apex of this cross-sectional shape which bears against the other side of the rib-groove.

* * * * *